Jan. 26, 1937. M. A. SISK 2,069,022
AUTOMATIC VALVE
Filed Aug. 26, 1932 3 Sheets-Sheet 3
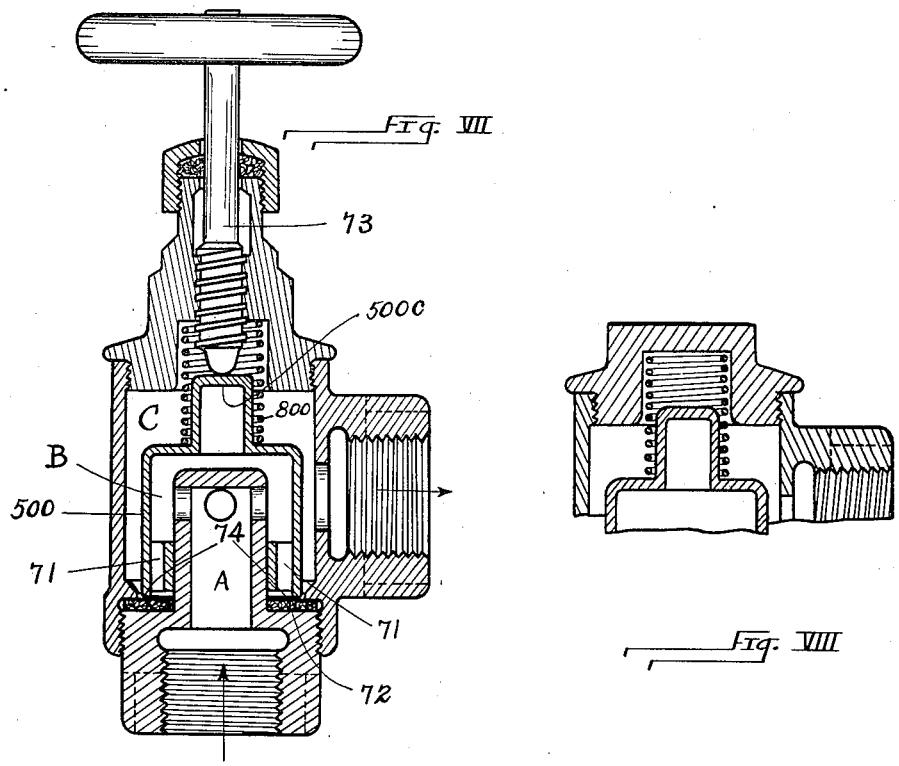

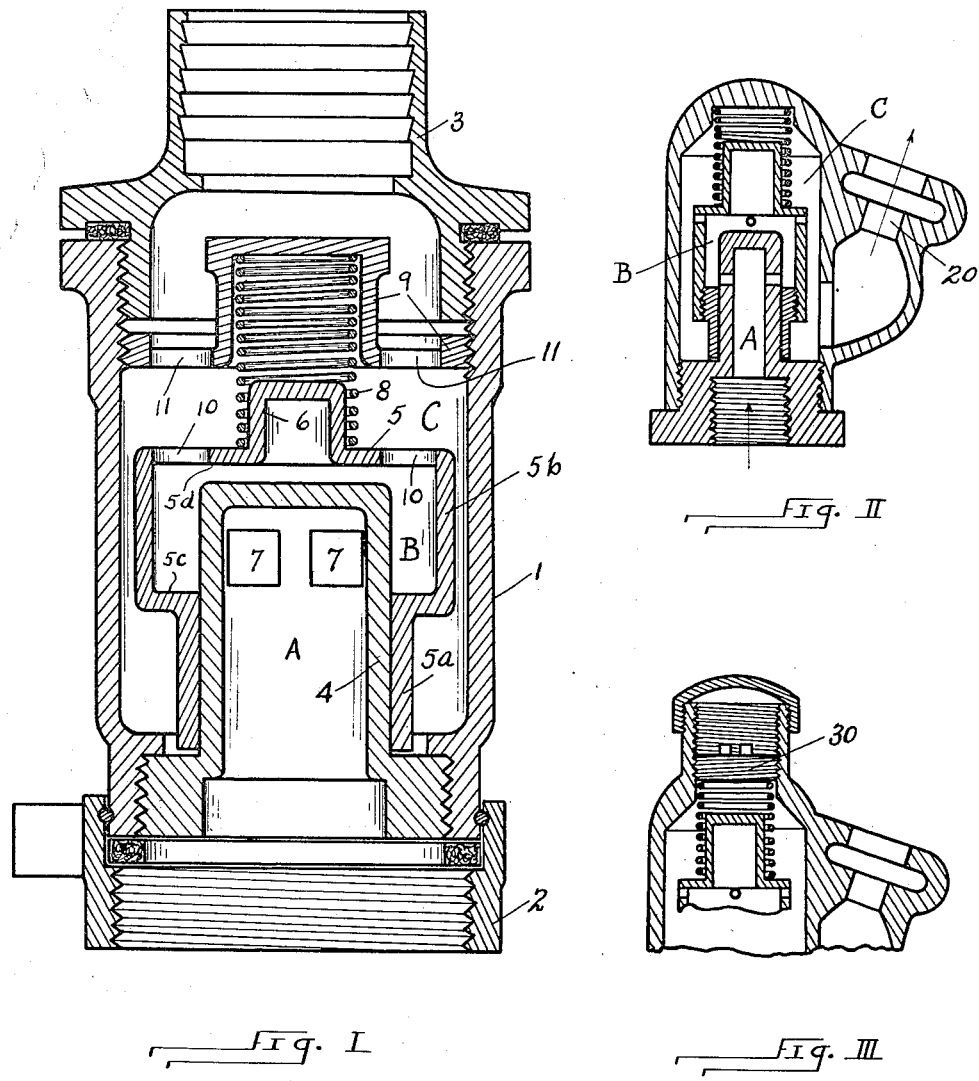

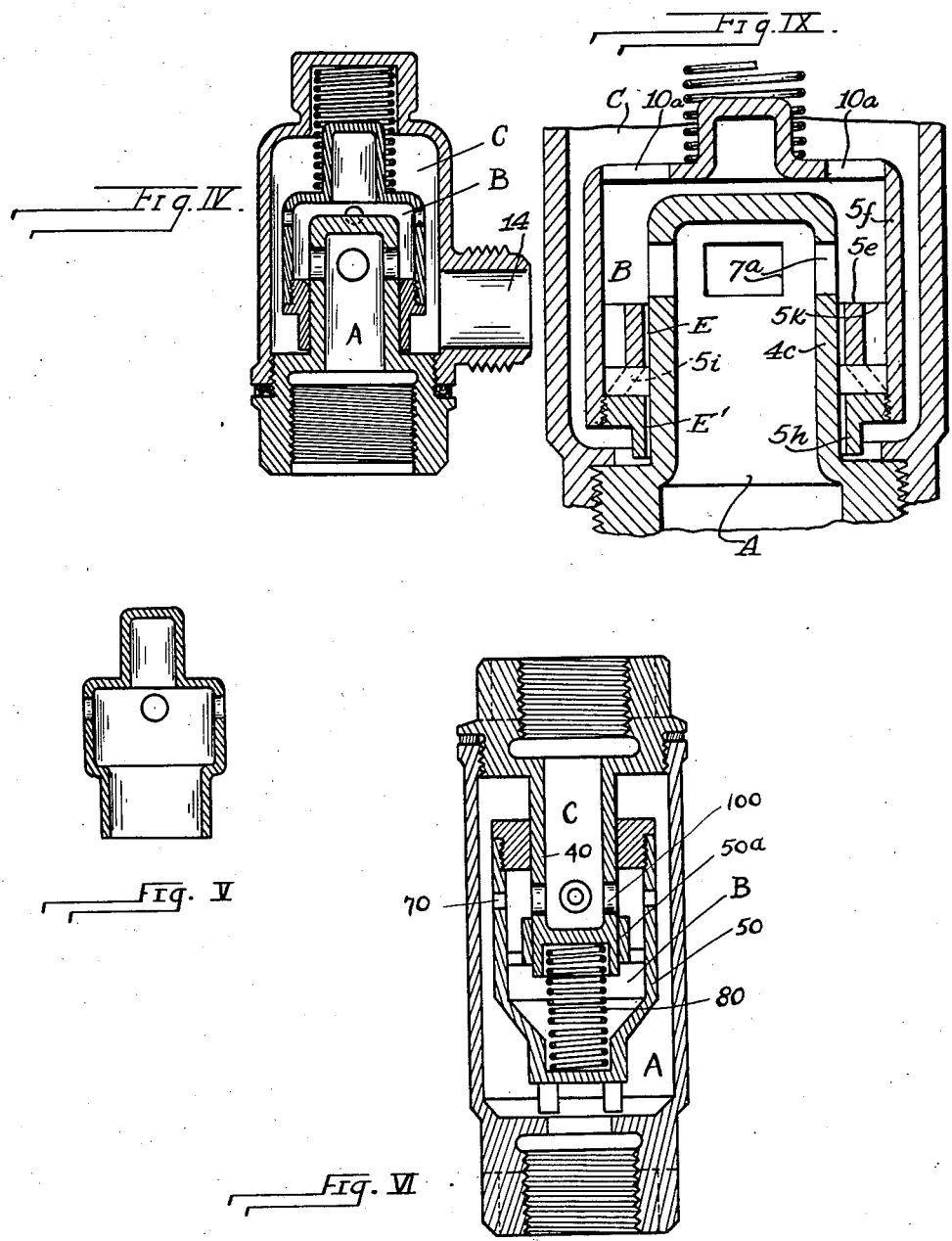

Patented Jan. 26, 1937

2,069,022

UNITED STATES PATENT OFFICE 2,069,022

AUTOMATIC VALVE

Martin A. Sisk, Pittsburgh, Pa.

Application August 26, 1932, Serial No. 630,520

18 Claims. (Cl. 50—14)

My invention relates to a regulating valve, a valve particularly designed for the automatic regulation of hydraulic flow. The valve is adapted for installation in a conduit carrying liquid, or it may be organized at the inlet or outlet of the conduit, and in any case is responsive within practical limits to hydraulic pressure conditions within the conduit for regulating automatically the volumetric rate of flow. Such control over the volumetric rate of flow of liquids is desirable in drinking fountains, especially in fountains providing a continuous spurt of water. In water-heating apparatus, lavatory and shower-bath equipment, and in fire hydrant and hose lines, my automatic valve finds utility. It is needless to recite the many other cases where the valve may be employed with good results. Suffice it to say that in the accompanying drawings I show the valve structure, and illustrate how it may be modified in certain details, to adapt it for various conditions of service.

All figures of the drawings are views in cross-section, each taken on the axis of the valve illustrated. Fig. I is a view of the valve structure, adapted for a fire hose; Fig. II is the valve for use in a drinking fountain; Fig. III is a fragmentary view, showing a modification of the structure in Fig. II; Fig. IV shows the valve adapted for service with a water heater; Fig. V shows in detail a modification in one of the valve elements; Fig. VI illustrates a modification in the internal arrangement of the valve members; Fig. VII illustrates the valve structure in combination with a positive valve, and shows also that the structure may be adapted to check back flow in the line; Fig. VIII is a fragmentary view showing the valve of Fig. VII without the positive valve elements; and Fig. IX is a fragmentary view of the valve, showing to larger scale still another modification.

In general, valves for the automatic control of flowing liquids are old, and it is to be understood that the object of my invention is to provide a valve of refined and simplified construction, a valve which operates with greater precision in controlling the volumetric rate of liquid flow. In stating that my automatic valve is particularly designed to control the volumetric rate of flow, I intend to distinguish from an automatic valve whose regulating or flow controlling element is responsive to differences between atmospheric pressure and the static pressure of the liquid flowing into the valve, and I remark that the flow controlling element in my structure responds to differential pressure of the liquid between two chambers or two regions within the valve itself.

The automatic regulating valve, as shown in Fig. I, is particularly adapted for use on a fire hose, and comprises a metal housing 1 which is provided at one end with a coupling 2 for attachment to a water supply line or hydrant. The opposite end of housing 1 is provided with a fixture 3, by means of which fixture the valve may be secured to a fire hose.

A stationary valve member 4 is secured in the structure, conveniently by means of threaded engagement with the housing 1. The member 4 comprises a tubular wall or partition; its inner end is closed by a transverse wall, and its outer end is open, affording communication with the supply line or hydrant to which the coupling 2 connects the structure. The liquid whose flow is to be governed enters the chamber A within the stationary valve member 4, and in the following description and claims I shall term such chamber the inlet chamber.

Mounted externally upon the stationary valve member 4, and within the housing 1, is a movable valve member 5. The wall portion 5a of the movable valve member lies in snug sliding fit with the outer surface of fixed member 4, while the wall portion 5b is offset radially outward from wall portion 5a, providing between the members 4 and 5 an intermediate chamber B. Ports 7 in the wall of member 4 provide direct passage between the inlet chamber A and the intermediate chamber B.

The movable valve member 5 is provided with a lug or boss 6, providing in conjunction with the adjoining wall of the valve member a seat for one end of a helical compression spring 8. The opposite end of the spring 8 nests in a socket plate or spider 9, which is secured to the housing 1 by means of the threaded engagement illustrated. Manifestly, such threaded engagement permits adjustment of the socket plate 9 in the direction of the spring compression; accordingly, the effective force of the spring may be regulated. Externally of the movable valve member 5 and internally of the housing 1, I provide a third chamber C. The third chamber is denoted the outlet chamber. Orifices 10 afford immediate communication between the intermediate and outlet chambers B and C. Escape from the outlet chamber C is had by way of ports 11. The ports 11 open directly into the fixture 3, which, as mentioned, is secured to the liquid-discharging line—in this case a fire hose.

In service, water enters the inlet chamber A under a supply pressure P1, and thence flows through ports 7 and directly enters the intermediate chamber B. Under a pressure P2 in the intermediate chamber B the water flows through orifices 10 into the outlet chamber C. In flowing from one chamber to another, the effective head or pressure of the water drops, so that a decreased pressure P3 is the head under which the water is fed from the outlet chamber C. The pressure P2 of the liquid in chamber B is effective upon an area equal to the difference between the projected areas of the two end walls 5c and 5d of the movable member 5, and the resultant force tends to produce the rise of valve member 5. The aforesaid force tending to produce the rise of member 5 is opposed by the force of spring 8 plus the force effected by pressure P3 of the liquid in outlet chamber C. The pressure P3 is effective in resisting the rise of valve member 5 upon the aforesaid differential area between walls 5c and 5d.

It will be observed in the drawings that the wall portion 5a of the valve member 5, in snugly fitting the wall of chamber A, serves as a valve or gate for the ports 7. That is, when the valve member 5 rises or falls in response to pressure conditions within the valve, the wall portion 5a correspondingly is instrumental in diminishing or increasing the effective area of ports 7. Under conditions of service, when the differential pressure between inlet chamber A and outlet chamber C (P1 minus P3) increases, there occurs simultaneously a momentary increase in flow through the valve. This momentary increase in flow through ports 10 results in a momentary increase in the differential pressure between chambers B and C (P2 minus P3). Such momentary increase in differential pressure (P2 minus P3) effects the rise of the movable valve member 5. However, accompanying the rise of valve member 5 is the constriction of ports 7 in the manner indicated, so that the effect of the increase in pressure differential (P1 minus P3) is throttled, and the predetermined difference between the pressures in the intermediate and outlet chambers B and C is instantaneously restored. That is to say, pressure P2 minus pressure P3 is maintained substantially constant. The pressure differential between the intermediate and outlet chambers of the valve being constant, the flow through the valve and its associated conduit, or other equipment with which the valve is associated, is uniform within the practical range of pressures for which the valve is designed. Conversely, a decrease in the differential pressure (P1 minus P3) is accompanied by a lowering or fall of the movable valve member 5 and an opening of the ports 7. This latter action of the valve and its effect upon pressure conditions are opposite to the aforesaid operation accompanying an increase in pressure differential (P1 minus P3), and this reverse operation of the valve also makes for constant pressure differential (P2 minus P3).

It is characteristic of my valve that the passages 10 between the intermediate and outlet chambers are located in the movable wall between such chambers. It will be understood that in general the total area of the orifices 10 is such as to create a pressure differential between intermediate and outlet chambers during the flow of liquid through the valve, i. e., P2 exceeds P3 during normal operation of the valve. This pressure differential is exerted upon the movable valve member 5 over an area equal to effective area 5d minus area 5c, and produces a differential pressure force tending to move valve member 5 upward (Fig. I). The opposed force of spring 8 equalizes the differential pressure force mentioned, and momentary variations in the differential pressure are reflected in adjustments of the movable valve member 5, whereby the area of ports 7 and the flow through them are so governed as to maintain a constant pressure differential (P2 minus P3) between chambers B and C. It will be perceived, therefore, that a given area of orifices 10 and a given spring force will regulate to a nicety the volumetric rate fo flow through the valve structure. Other conditions being equal, a stronger spring manifestly will establish a greater pressure differential between chambers B and C, and a weaker spring will maintain a smaller pressure differential, so that in selection of spring I am able to determine a pressure differential (P2 minus P3) that will effect the desired volumetric rate of flow. I also contemplate that the rate of flow may be regulated by decreasing or increasing the total area of orifices 10.

In brief, my valve structure includes three chambers A, B and C, and all chambers are symmetrical with respect to a common axis, and the successive chambers are in immediate or direct communication with one another, cf. passages 7 and 10, Fig. I. One chamber is located within a tubular wall, and the passage for liquid comprises a port in such tubular wall. In the structure of Fig. I, the inlet chamber A is the chamber lying within the tubular or cylindrical wall (4) and the ports (7) in the tubular wall constitute the passage to the next chamber (B). An external wall or gate, in this case the wall 5a, is provided with sliding fit upon the external face of the tubular wall (4), and means responding to momentarily varying pressure differential (P2 minus P3) between the chambers B and C, as above explained, is effective to shift the wall (5a) and thus automatically adjust the effective area of the ports (7) in the tubular wall (4). The means responding to such momentarily varying pressure differential comprises the chamber wall (5) of the intermediate chamber (B), which chamber wall is movable relatively to the tubular wall (4). In the structure of Fig. I, the wall (5a) and the means for moving it (chamber wall 5) comprise an integral valve member, while in the following specification certain modifications of this structure are described.

It will be observed that the engagement of the wall (5a) with the tubular wall or partition (4) is the sole frictional engagement between the relatively movable parts 4 and 5 of the valve. Accordingly, mechanical friction losses are reduced to a minimum and the valve is capable of proportionately high efficiency or accuracy in service.

In Fig. II the automatic valve structure is shown in a design for a drinking fountain. As in the valve above described, the drinking fountain valve includes three chambers A, B, and C. An orifice 20 is adapted to form the water passing from the outlet chamber C into a flowing spurt. The internal structure of the valve is substantially the same as in the valve first described, save that the compression spring bears directly against the housing of the valve. Additionally, the movable valve elements, within which the intermediate chamber B is located, is constructed in two parts, as shown in the drawings, but such detail is principally a matter of mechanical expediency.

The simplicity of the structure, and the particular organization of the internal elements of the valve, are responsible for the precise regulation of the flow through my valve. Of course, such regulation of the flow produces a jet of water which plays within a predetermined range, and practically eliminates undesirable fluctuations in the heighth of the jet.

Fig. III illustrates that the force of the compression spring may be made adjustable. Advantageously, an abutment 30 is mounted in threaded engagement with the valve housing to admit of such spring adjustment. Manifestly, regulation of the compression spring permits control of the differential pressure between the intermediate and outlet chambers of the valve. Accordingly, within certain limits I provide for variation in the governed flow of liquid, and in the case of the drinking fountain valve the heighth of the jet of water is subject to regulation.

Fig. IV shows the valve in a construction particularly adapted for controlling the flow of water through the heating coils of a water heater.
The essential elements of the structure lie within the description already given. Together with the other figures of the drawings, Fig. IV is illustrative that the organization of the outlet chamber C within the valve housing permits great variation both in the location and in the structure of the outlet passage (14), so that only minor modifications in the housing are necessary to adapt the valve for any one of the many services in which it may advantageously be utilized. Fig. V is a detail, showing that the movable valve element may conveniently comprise a unitary metal part, instead of being a two-piece element as shown in Figs. II and IV.

Fig. VI illustrates that in certain respects the internal construction of the valve may be reversed. That is to say, the outlet chamber C may be the chamber located within the cylindrical or tubular wall 40. The intermediate chamber B is located within the walls of a movable member 50, which member 50 (as the member 5, Fig. I) is movable relatively to the tubular wall 40. The inlet chamber A is located without the member 50, and liquid flows under the superior pressure of the liquid in chamber A into the intermediate chamber B, ports 70 providing the passage. Instead of controlling the ports between the inlet and intermediate chambers A, B, as in the structures shown in Figs. I–IV, I control the ports 100 which extend through the tubular wall and open into the outlet chamber.

The movable member 50 carries the gate or wall 50a, which lies in snug sliding engagement with the external face of cylindrical wall 40. The compression spring 80 is located between the stationary end wall of chamber C and the end wall of movable valve member 50.

Upon the same general principles as those governing the differential pressure between the intermediate and outlet chambers B and C of the valve shown in Fig. I, the structure of Fig. VI is effective in maintaining substantially constant pressure differential between the inlet and intermediate chambers A and B. That is, the movable valve member 50 responds to momentary variations in differential pressure between inlet and intermediate chambers A and B (P1 minus P2), to effect an automatic control of the ports 100.

Fig. VII illustrates that the automatic valve may include additional features of value. In general, the automatic flow-controlling structure of this valve is the same as that shown in Figs. I–IV. However, there are the following distinctions to be noted: Communication between the intermediate and outlet chambers B and C is by way of passages 71; the movable valve member (500) includes a peripheral edge 74 which is adapted to seat tightly upon a gasket 72 and to prevent liquid flow from the intermediate chamber B to the outlet chamber C. Therefore, the movable valve member (500), in addition to its normal function in governing the pressure differential between the intermediate and outlet chambers, may serve as an element of a positive shut-off or stop valve. To further the utility of the structure as a stop valve, a threaded locking stem 73 of simplified construction is organized in the valve housing, and the inner terminus of the stem 73 may be run down (Fig. VII) against the wall portion 500c of the movable valve member (500).
It will be perceived, therefore, that the edge 74 of member 500 may be locked against the gasket member or valve seat 72, whereby the structure may serve as a stop valve. Of course, for normal operation the valve stem 73 is elevated, freeing the member 500 for operation in maintaining a constant pressure differential between the intermediate and outlet chambers B and C.

In some installations there is a tendency for the pressure in the discharge line to increase suddenly to a higher value than the pressure normally effecting flow in the desired direction. That is to say, as a result of conditions beyond present considerations, the pressure of the fluid in the outlet chamber C becomes greater than the pressure in inlet chamber A, and, if it were not prevented, this temporary pressure condition would effect a reverse or back flow in and through the valve. Manifestly, such back flow is in many cases undesirable, and, hitherto, to insure against back flow, a special check valve was installed in the line or conduit. In my structure a preponderant back pressure in the outlet chamber is effective in the same general direction as the force of spring 800 and, together with the force of such spring, the abnormally high or preponderant back pressure mentioned is effective to move the valve member 500 into seated position upon the gasket 72 and thus prevent back flow. Accordingly, the structure of Fig. VII serves normally as a check valve, as well as a flow-governing valve, and may at the will of the user be also employed as a positive stop valve. Fig. VIII is entered to show that the stem 73 may be omitted in cases where the positive stop valve service is not required.

Fig. IX illustrates a modification of the valve shown in Fig. I; the modified structure is of great practical value, and is such in nature as can be readily incorporated in many of the other automatic valve structures described. In describing this important modification I may explain initially that the sliding engagement between the stationary and movable walls of the valves described requires that the parts be accurately machined and nicely fitted together, otherwise unintended flow or escape of liquid between the valve chambers will occur. However, while such machining and nice fitting of the parts are readily accomplished, there is this objection: Most liquids contain small percentages of impurities (such as alkalies, acids, or undissolved solids), and in normal service of the valve the impurities in the liquid tend to corrode the valve parts or for other reasons tend to restrain the desired freedom of movement of the nicely fitting parts, and thus destroy the accuracy of the valve. As illustrated in Fig. IX, I have discovered how a loose fit may be provided between the relatively movable parts of the valve, thus affording the desired freedom of movement of the parts without destroying the accuracy of the valve in controlling the volumetric rate of flow of the liquid.

The flow-controlling wall or gate portion 5e of the structure lies within the intermediate chamber B of the valve; that is, the gate portion 5e, which is slidable with loose fit over the stationary wall 4c of the inlet chamber A, does not lie (or extend) without the chamber B, as in the structure shown in Fig. I. Accordingly, liquid in escaping between the gate (5e) and the stationary wall (4c) does not flow from one chamber to another, but is by-passed into the chamber (B) into which it is intended to flow. Considering Fig. IX, it will be observed that, as the gate 5e rises to constrict the ports 7a, the liquid escaping through the interval or clearance E between the wall 4c and the gate wall 5e does not immediately enter the outlet chamber C (as in the case of the valve shown in Fig. I), but it is by-passed from the base of clearance E into the chamber B into which it is intended to flow.

The movable valve member 5f (Fig. IX) carries a wall portion 5h, and this wall portion serves to interrupt the escaping flow of liquid through the clearance E, thus insuring the by-passing of the escaping fluid into chamber B. It is manifest that the gate 5e may be integrated with the wall portion 5h, by means of legs (cf. dotted lines 5i), instead of being directly connected to the wall of the movable valve member 5f by means of ribs 5k. There is a substantial clearance E' between the wall portion 5h and the wall 4c, and there is no tight or snug fit between any of the relatively movable parts in the valve. Of course, some liquid escapes through clearance E' from the intermediate chamber B into outlet chamber C, but it does so under the established pressure differential effective between the chambers B and C, while in the case of the Fig. I structure, the water escaping between the walls 4 and 5a does so under the pressure differential effective between the chambers B and C augmented by variable factors which are dependent upon fluctuations of pressures in the chambers A and C.

The effect of the flow through clearance E' is the same as the effect of the flow through orifices 10a. That is, the clearance E' affords direct communication between chambers B and C in the same manner that the ports 10a afford communication between such chambers. Accordingly, the flow through clearance E' is fully controlled, as the flow through the ports 10a is controlled, and the desired loose fit between the relatively movable parts of the valve is provided, without impairing the accuracy of the valve. Indeed, in some cases I contemplate that the parts 10a may be entirely dispensed with, and the sole communication between the chambers B and C may be by way of the clearance E'.

Notice is hereby given of my co-pending application, Serial No. 117,111, filed December 22, 1936, directed to automatic flow-controlling valves.

I claim as my invention:

1. An automatic valve for regulating the volumetric flow of liquid, which valve includes an inlet chamber, an intermediate chamber and an outlet chamber, passages between said chambers so organized that the flowing liquid advances directly from one chamber to another in the sequence in which said chambers are above named, one of said chambers being located within a tubular wall and the passage from said chamber comprising at least one port in such tubular wall, the chamber walls of another of said chambers being movable relatively to said tubular wall in response to varying pressure differential between said chambers, said chamber walls including a wall portion extending in the general direction of said tubular wall and being spaced an appreciable interval therefrom, yielding means opposing the relative movement between said tubular wall and said chamber walls in one direction and assisting such movement in the opposite direction, and a valve wall portion connected to said chamber walls and having sliding fit with the face of said tubular wall for the control of said port.

2. An automatic valve for regulating the volumetric flow of liquid, which valve includes an inlet chamber, an intermediate chamber and an outlet chamber, passages between said chambers so organized that the flowing liquid advances directly from one chamber to another in the sequence in which said chambers are above named, said inlet chamber extending into a cylindrical wall and the passage from said inlet chamber comprising a port extending through said wall, a hollow movable member including a wall portion extending in the general direction of said cylindrical wall and being spaced an appreciable interval therefrom, said hollow movable member including also a valve wall portion in sliding engagement with said cylindrical wall and adapted to constrict said port, said intermediate chamber being located within said hollow member and said outlet chamber being located without the same, a compression spring fixed to bear against said hollow member in opposition to pressure existing within the hollow member or intermediate chamber.

3. In an automatic valve for regulating the volumetric flow of liquid, which valve includes an inlet chamber extending into an externally cylindrical wall, a movable hollow member mounted upon said cylindrical wall, said hollow member including a wall portion extending in the general direction of said cylindrical wall and being spaced an appreciable interval therefrom and forming within the hollow member and without the cylindrical wall an intermediate chamber, a port in said cylindrical wall affording passage between said inlet and intermediate chambers, said hollow member including a valve wall portion slidable upon said cylindrical wall and controlling said port, an outlet chamber located externally of said hollow member, and a passage extending through the wall of said hollow member and into said outlet chamber, a spring bearing against said hollow member, said hollow member being movable relatively to said cylindrical wall in response to varying differential pressure between liquid within the hollow member and liquid in said outlet chamber, whereby said hollow member and the valve wall included therewith are shifted and the effective area of said port is varied, said spring being adapted to resist movement of said hollow member in one direction.

4. A drinking fountain valve for regulating the volumetric flow of a spurt of water, which valve includes an inlet chamber extending into an externally cylindrical wall, a movable hollow member mounted upon said cylindrical wall, said hollow member including a wall portion extending in the general direction of said cylindrical wall and being spaced an appreciable interval therefrom and forming within the hollow member and without the cylindrical wall an intermediate chamber, a port in said cylindrical wall affording passage between said inlet and intermediate chambers, said hollow member including a valve wall portion slidable upon said cylindrical wall and controlling said port, an outlet chamber located externally of said hollow member, and a passage extending through the wall of said hollow member and into said outlet chamber, and a passage from said outlet chamber for a spurt of water, said hollow member being movable relatively to said cylindrical wall in response to varying differential pressure between liquid in said outlet chamber and liquid located between said cylindrical wall and the walls of said hollow member, whereby said hollow member and said valve wall portion are shifted and the effective area of said port is varied to maintain the differential pressure between intermediate and outlet chambers substantially constant.

5. An automatic valve for regulating fluid flow, said valve comprising a chamber within a tubular partition, a port in said partition, a second chamber communicating with said port, and a hollow valve member slidable against said tubular partition for regulating the area of said port, resilient means cooperating with said hollow valve member, whereby normally said valve member responds to variations in differential pressure between said chambers for regulating flow through the valve, and means adapted at the will of the attendant to shift said hollow valve member axially of said tubular partition and lock it in valve-closing position.

6. An automatic valve for regulating fluid flow, said valve comprising an inlet chamber, a port in the wall of said inlet chamber, a hollow member whose walls together with the walls of said inlet chamber define between them an intermediate chamber, an outlet chamber, and a passage from said intermediate chamber to said outlet chamber, said hollow member being slidable externally against the walls of said inlet chamber and including a wall portion for regulating the area of said port during such relative movement, said hollow member being responsive in its movement to variations in pressure differential between said chambers for automatically regulating flow through the valve, and means adapted at the will of the attendant to shift said hollow member axially of said inlet chamber and lock it in valve-closing position.

7. An automatic valve for regulating fluid flow, said valve comprising an inlet chamber, a port in the wall of said inlet chamber, a hollow member whose walls together with the walls of said inlet chamber define an intermediate chamber, an outlet chamber, and a passage from said intermediate chamber to said outlet chamber, said hollow member being slidable against the walls of said inlet chamber and including a wall portion for regulating the area of said port during such relative movement, said hollow member being responsive in its movement to variations in pressure differential between said chambers for automatically regulating flow through the valve, said hollow member including a peripheral edge past which flow occurs between two of said chambers, a valve seat for cooperation with said peripheral edge, and said hollow member being movable under a preponderant pressure in said outlet chamber for seating said peripheral edge upon said valve seat.

8. An automatic valve for regulating fluid flow, said valve comprising an inlet chamber, a port in the wall of said inlet chamber, a hollow member whose walls together with the walls of said inlet chamber define an intermediate chamber, an outlet chamber, and a passage from said intermediate chamber to said outlet chamber, said hollow member being slidable against the walls of said inlet chamber and including a wall portion for regulating the area of said port during such relative movement, said hollow member being responsive in its movement to variations in pressure differential between said chambers for automatically regulating flow through the valve, said hollow member including a peripheral edge past which flow occurs between two of said chambers, a valve seat for cooperation with said peripheral edge, and said hollow member being movable under a preponderant pressure in said outlet chamber for seating said peripheral edge upon said valve seat, and means adapted at the will of the attendant to cooperate with said hollow member for positively closing said edge against said seat.

9. An automatic flow-controlling valve including a chamber extending into a tubular partition, a port in said partition, a valve member movable axially of said tubular partition and including a gate for regulating (in response to the movement of said valve member) the effective area of said port, said valve member including a wall portion offset outwardly a substantial interval from said tubular partition and providing between said partition and said wall portion a second chamber, a third chamber located externally of the walls of said movable valve member, said movable valve member being responsive in its movement to varying differential pressure between said chambers, a passage from the second chamber to the third, a seat, and means carried by said movable valve member and adapted to cooperate with said seat for closing said passage, said movable valve member being responsive to excessive back pressure in the valve for shifting said means into position upon said seat.

10. An automatic flow-controlling valve including a chamber extending into a tubular partition, a port in said partition, a valve member movable axially of said tubular partition and including a gate for regulating (in response to the movement of said valve member) the effective area of said port, said valve member including a wall portion offset outwardly a substantial interval from said tubular partition and providing between said partition and said wall portion a second chamber, a third chamber located externally of the walls of said movable valve member, said movable valve member being responsive in its movement to varying differential pressure between said chambers, a passage from the second chamber to the third, a seat, and means carried by said movable valve member and adapted to cooperate with said seat for closing said passage, said movable valve member being responsive to excessive back pressure in the valve for shifting said means into position upon said seat, and means for positively engaging said movable valve member to lock said seat-engaging means in seated position.

11. A valve for automatically regulating liquid flow, said valve including a tubular partition between two valve chambers, a port in said tubular partition, a movable hollow member including a wall portion extending in the general direction of and located externally of said tubular partition and providing externally of said tubular partition and internally of said movable member an intermediate valve chamber, said movable member engaging said tubular partition for a portion of its extent, yielding means organized between said movable member and a stationary portion of said valve, said movable member and yielding means responding to variations in differential pressure between said chambers, whereby the portion of said movable member engaging said tubular partition automatically regulates the effective area of said port, and the engagement of said port-regulating portion of said movable member with said tubular partition being the sole sliding engagement between such movable member and stationary parts of the valve structure for guiding said hollow member in its movement.

12. A valve for automatically regulating liquid flow, said valve including a tubular partition between two valve chambers, a port in said tubular partition, a movable hollow member including a wall portion extending in the general direction of and located externally of said tubular partition and being spaced an appreciable interval therefrom and providing between said partition and said wall portion a valve chamber between the two first-mentioned valve chambers, said movable hollow member including a second wall portion offset a substantial interval from the first-mentioned wall portion thereof, said second-mentioned wall portion being slidable externally upon said tubular partition, yielding means cooperating with said movable member, whereby, in response to variations in pressure differential between said valve chambers, said movable member shifts and effects regulation of the effective area of said port, and the sliding engagement between the second-mentioned wall portion of said movable member and said tubular partition being the sole sliding engagement of the movable member with other parts of the valve.

13. An automatic valve including two valve chambers, a ported wall between said chambers, a valve member movable relatively to said wall, a gate carried by said valve member and being movable over said wall and transversely of the port included therein for varying the effective area of said port, a friction-reducing clearance between said wall and said gate, whereby fluid streaming through said port from one chamber to the other flows in divided stream, one portion of which stream flows through the unrestricted area of said port and immediately into the second chamber, and the other portion of which stream escapes through the restricted area of said port and enters said clearance, and means for interrupting or deflecting the escaping portion of said stream and causing it to enter said second chamber, whereby both portions of the divided stream enter such chamber.

14. An automatic flow-controlling valve including a chamber extending into a tubular partition, a port in said partition, a valve member movable axially of said tubular partition, said valve member including a wall offset from said tubular partition, and providing between said partition and said wall a second chamber, a third chamber located externally of said movable valve member, said movable valve member including a passage from the second chamber to the third, a gate carried by said valve member and being movable over said tubular partition transversely of the port included therein for varying the effective area of said port, a friction-reducing clearance between said partition and said gate, whereby fluid streaming through said port from the first chamber to the second flows in divided stream, one portion of which stream flows through the unrestricted area of said port and immediately into said second chamber, and the other portion of which stream escapes through the restricted area of said port and enters said clearance, and means for causing the escaping portion of said stream to enter said second chamber, whereby both portions of the divided stream enter said second chamber.

15. An automatic valve including a chamber extending into a tubular partition, a port in said partition, a movable hollow valve member mounted externally of said tubular partition, said valve member including a wall spaced a substantial interval from said partition and providing wholly within said valve member and externally of said partition an intermediate chamber, a third chamber located externally of said movable valve member, said movable valve member including a passage between said intermediate chamber and said third chamber, a gate carried by said movable valve member, said gate being slidable upon the surface of said partition transversely of the port included therein for varying the effective area of said port and yielding means cooperating with said movable valve member, as described.

16. An automatic valve including a chamber extending into a tubular partition, a port in said partition, a movable valve member located externally of said tubular partition, said movable valve member including a wall portion spaced from said partition, and providing between said partition and said wall portion an intermediate chamber, a third chamber located externally of said movable valve member, said movable valve member including a passage between said intermediate chamber and said third chamber, a sleeve portion carried by said movable member, said sleeve portion being movable over said tubular partition transversely of said port included therein, a clearance between said tubular partition and said sleeve portion, said clearance communicating at its opposite ends with said intermediate chamber, as described.

17. An automatic regulating valve for fluids, said valve including a body, a partition in said body, a port in said partition, two valve chambers between which said ported partition extends, a movable valve member including a wall, between which wall and said ported partition one of said chambers is located, a gate carried by said movable member, said gate being movable relatively to said partition transversely of the port included therein for varying the effective area of said port, a clearance between said gate and said partition, whereby fluid streaming through said port flows in divided stream, one portion of which stream flows through the unrestricted area of said port, and the other portion of which stream escapes through the restricted area of said port and enters said clearance, and means for by-passing the fluid escaping through said clearance back into the same chamber into which fluid flows from the unrestricted area of said port.

18. An automatic valve for regulating fluid flow, said valve including an inlet chamber and an outlet chamber, a port in the wall of said inlet chamber, a hollow member movable relatively to the wall of said inlet chamber, and providing wholly between said wall and said movable member an intermediate chamber, said movable member carrying a gate slidably engaging said wall and movable transversely of said port for regulating flow through said port, and said movable member including a wall portion spaced laterally from the wall of said inlet chamber and lying an appreciable interval from said port, whereby a relatively large, velocity-reducing region is provided immediately adjacent said port for receiving the fluid streaming through said port into said intermediate chamber, whereby said movable valve member is minutely responsive to varying pressure differential between the bodies of fluid in said chambers, and yielding means cooperating with said movable member, as described.

MARTIN A. SISK.